US010926725B2

United States Patent
Agarwal et al.

(10) Patent No.: US 10,926,725 B2
(45) Date of Patent: Feb. 23, 2021

(54) NON-DESTRUCTIVE KIT MOUNTING SYSTEM FOR DRIVERLESS INDUSTRIAL VEHICLES

(71) Applicant: STOCKED ROBOTICS, INC., Austin, TX (US)

(72) Inventors: Saurav Agarwal, Austin, TX (US); Jacob Corder Currence, Austin, TX (US); Zoltan C. Bardos, Austin, TX (US)

(73) Assignee: STOCKED ROBOTICS, INC., Austin, TX (US)

( * ) Notice: Subject to any disclaimer, the term of this patent is extended or adjusted under 35 U.S.C. 154(b) by 0 days.

(21) Appl. No.: 16/597,723

(22) Filed: Oct. 9, 2019

(65) Prior Publication Data
US 2020/0114851 A1    Apr. 16, 2020

Related U.S. Application Data

(60) Provisional application No. 62/743,584, filed on Oct. 10, 2018.

(51) Int. Cl.
| | |
|---|---|
| *B60R 19/48* | (2006.01) |
| *B60Q 1/00* | (2006.01) |
| *G05D 1/02* | (2020.01) |
| *B60P 1/00* | (2006.01) |
| *B60R 11/00* | (2006.01) |

(52) U.S. Cl.
CPC .......... *B60R 19/483* (2013.01); *B60Q 1/0023* (2013.01); *G05D 1/024* (2013.01); *B60P 1/00* (2013.01); *B60R 2011/0052* (2013.01)

(58) Field of Classification Search
CPC ....... B60P 1/00; B60Q 1/0023; B60R 19/483; B60R 2011/0052; G05D 1/024
See application file for complete search history.

(56) References Cited

U.S. PATENT DOCUMENTS

| | | |
|---|---|---|
| 10,112,302 B2 | 10/2018 | Ji et al. |
| 10,112,303 B2 | 10/2018 | Vakanski et al. |
| 10,124,489 B2 | 11/2018 | Chitta et al. |
| 10,133,278 B2 | 11/2018 | Shin et al. |

(Continued)

OTHER PUBLICATIONS

Kalal, et al., "Tracking-Learning-Detection", IEEE Transactions on Pattern Analysis and Machine Intelligence, vol. 6, No. 1, Jan. 2010, 14 pages.

(Continued)

*Primary Examiner* — Sisay Yacob
(74) *Attorney, Agent, or Firm* — Jackson Walker LLP; Christopher J. Rourk

(57) ABSTRACT

A system comprising a sensor, a protective enclosure configured to enclose the sensor and a mounting pad configured to be attached to a predetermined surface of a predetermined vehicle, the mounting pad having a predetermined contact area as a function of a weight of the sensor and the protective enclosure. The sensor and the protective enclosure are attached to the mounting pad, and the mounting pad is attached to the predetermined surface of the vehicle using an adhesive layer that extends over the predetermined contact area that is selected to provide a maximum weight support that is correlated to a weight of the sensor and the protective enclosure.

20 Claims, 10 Drawing Sheets

(56) References Cited

U.S. PATENT DOCUMENTS

| | | | |
|---|---|---|---|
| 10,137,567 B2 | 11/2018 | Chen | |
| 10,144,342 B2 | 12/2018 | Ji et al. | |
| 10,152,062 B2 | 12/2018 | Schnittman | |
| 10,166,672 B1 | 1/2019 | Lotz | |
| 10,228,694 B2 | 3/2019 | Rodriguez | |
| 10,229,501 B2 | 3/2019 | Kim et al. | |
| 10,232,512 B2 | 3/2019 | Ooba et al. | |
| 10,232,897 B2 | 3/2019 | Hafenrichter et al. | |
| 10,238,258 B2 | 3/2019 | Kwak | |
| 10,239,378 B2 | 3/2019 | Liivik et al. | |
| 10,241,507 B2 | 3/2019 | Wang et al. | |
| 10,241,514 B2 | 3/2019 | Passot et al. | |
| 10,255,501 B2 | 4/2019 | Noh et al. | |
| 2009/0038403 A1* | 2/2009 | Kamei | G01L 1/16 73/774 |
| 2012/0056043 A1* | 3/2012 | Inoue | G01S 7/521 248/27.1 |
| 2016/0059420 A1* | 3/2016 | Ji | H04N 5/2256 348/148 |
| 2017/0248553 A1* | 8/2017 | Potts | G01N 29/4472 |

OTHER PUBLICATIONS

Garrido-Jurado, et al., "Automatic generation and detection of highly reliable fiducial markers under occlusion", In Pattern Recognition, vol. 47, Issue 6, 2014, pp. 2280-2292, ISSN 0031-3203.
Karaman, et al., "Incremental Sampling-based Algorithms for Optimal Motion Planning", In Proceedings of Robotics: Science and Systems, Jun. 2010, Zaragoza, Spain, 20 pages.

* cited by examiner

Front Enclosure 100
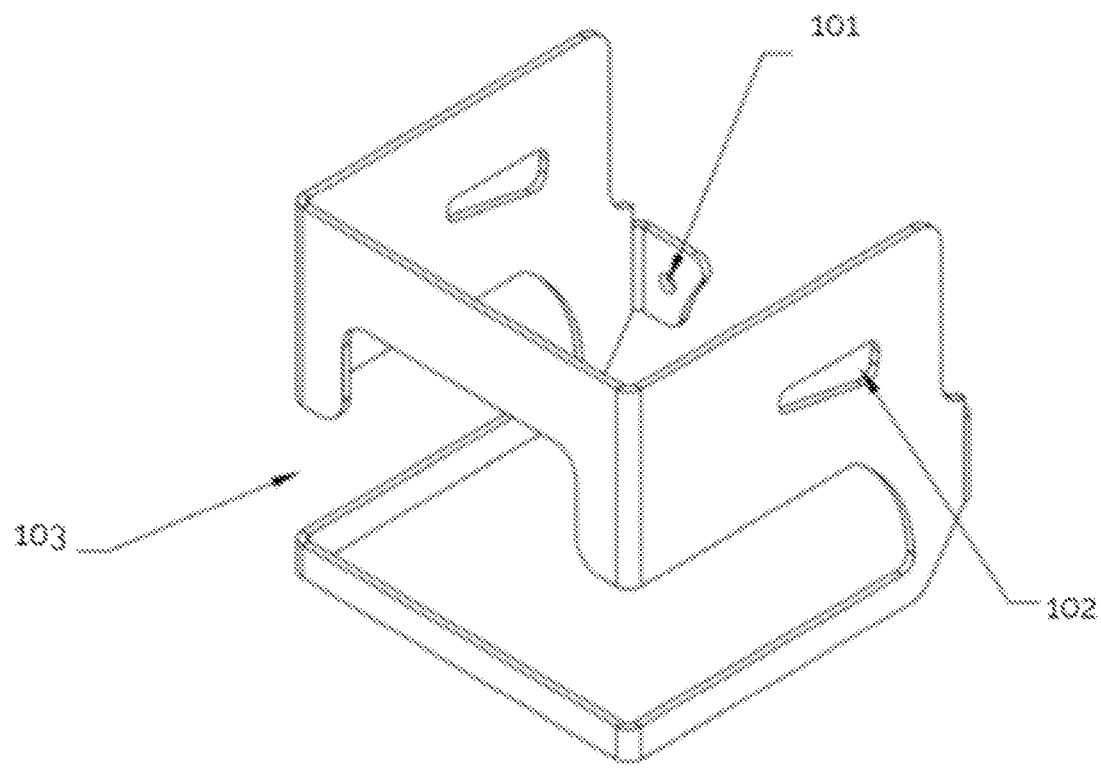
[Figure 1]

Side Enclosure 200
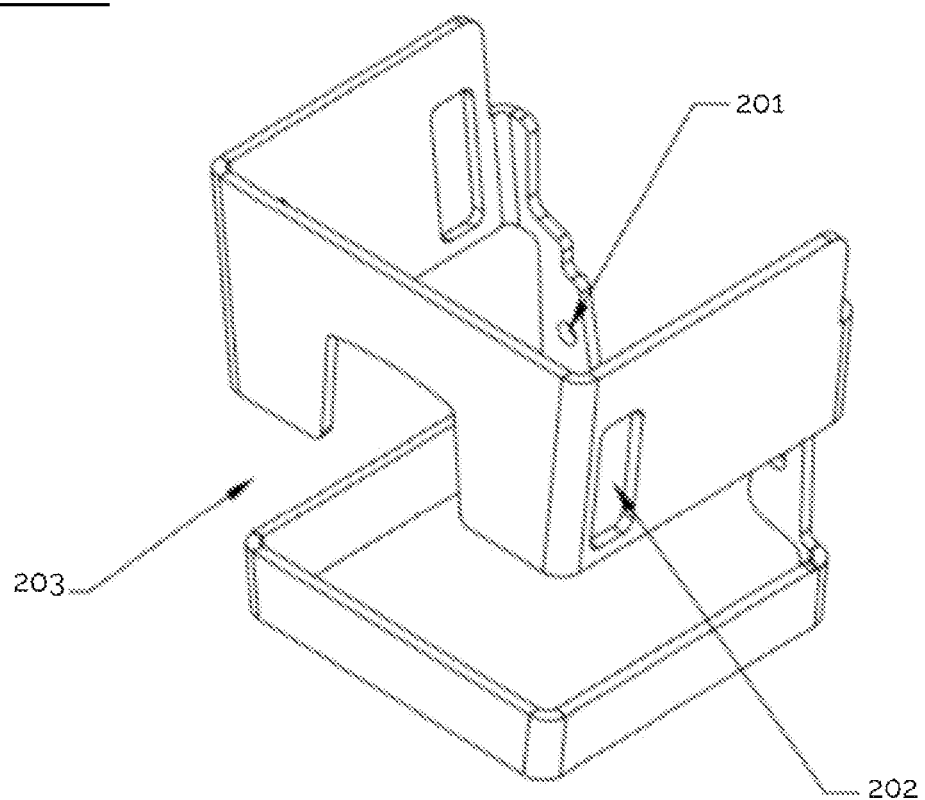
[Figure 2]

Front Mounting Pad 300
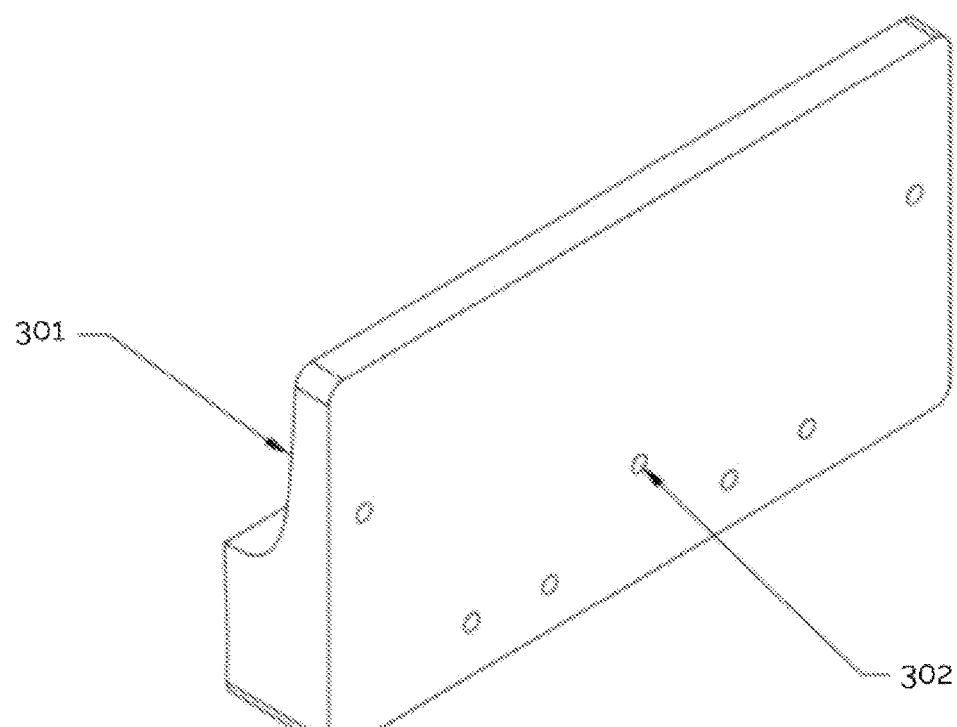
[Figure 3]

Side Mounting Pad 400
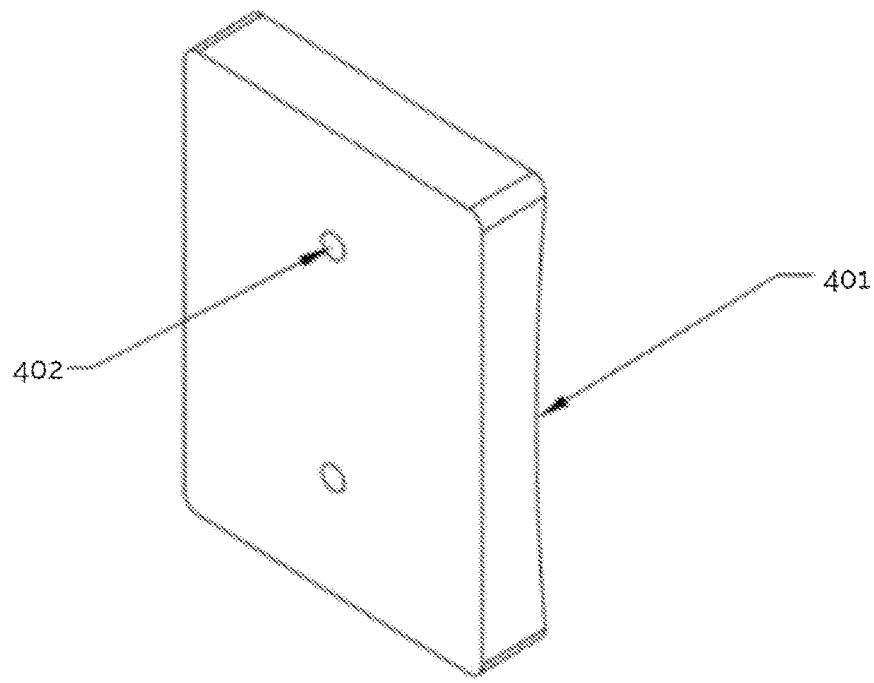
[Figure 4]

Front Mounting Pad 500
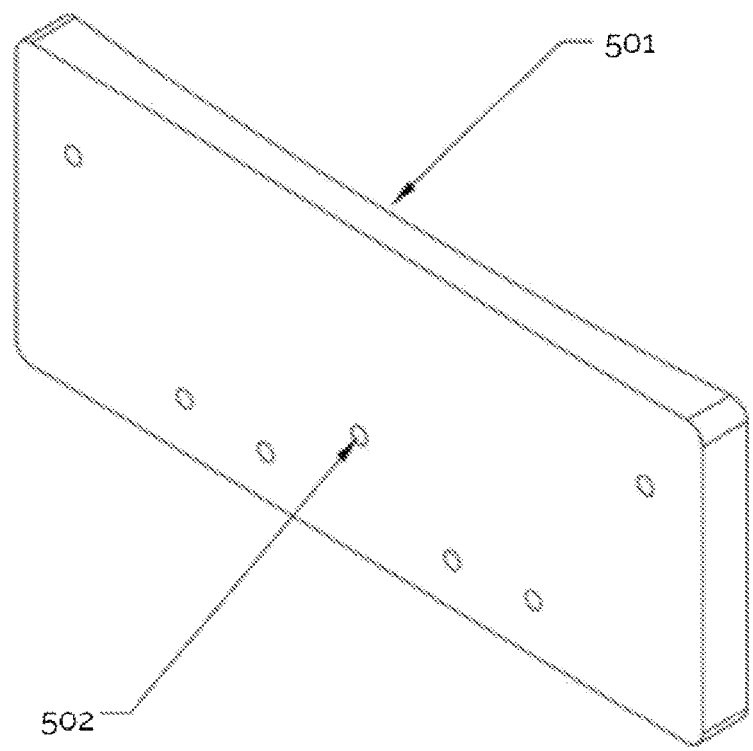
[Figure 5]

Side Mounting Pad 600
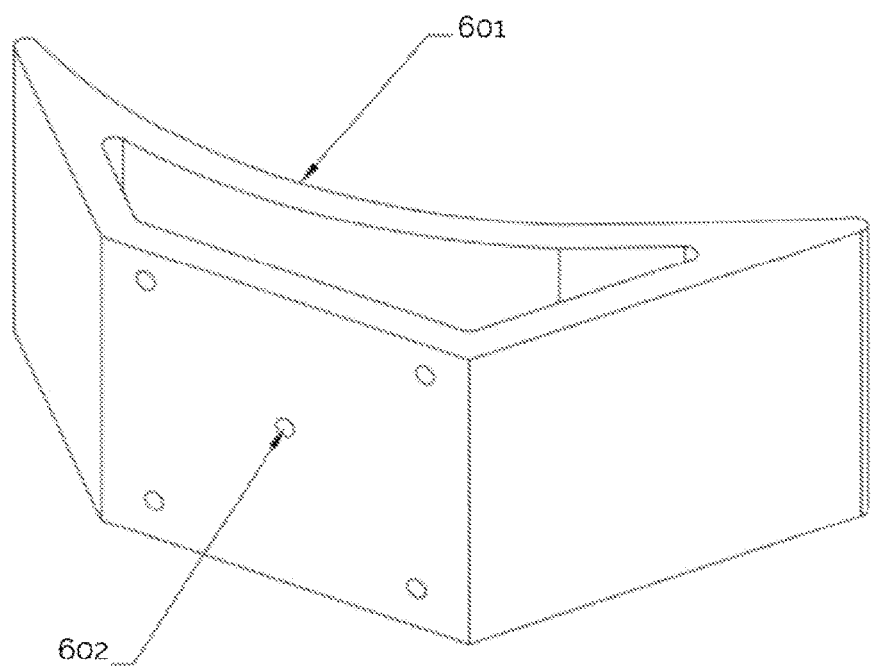
[Figure 6]

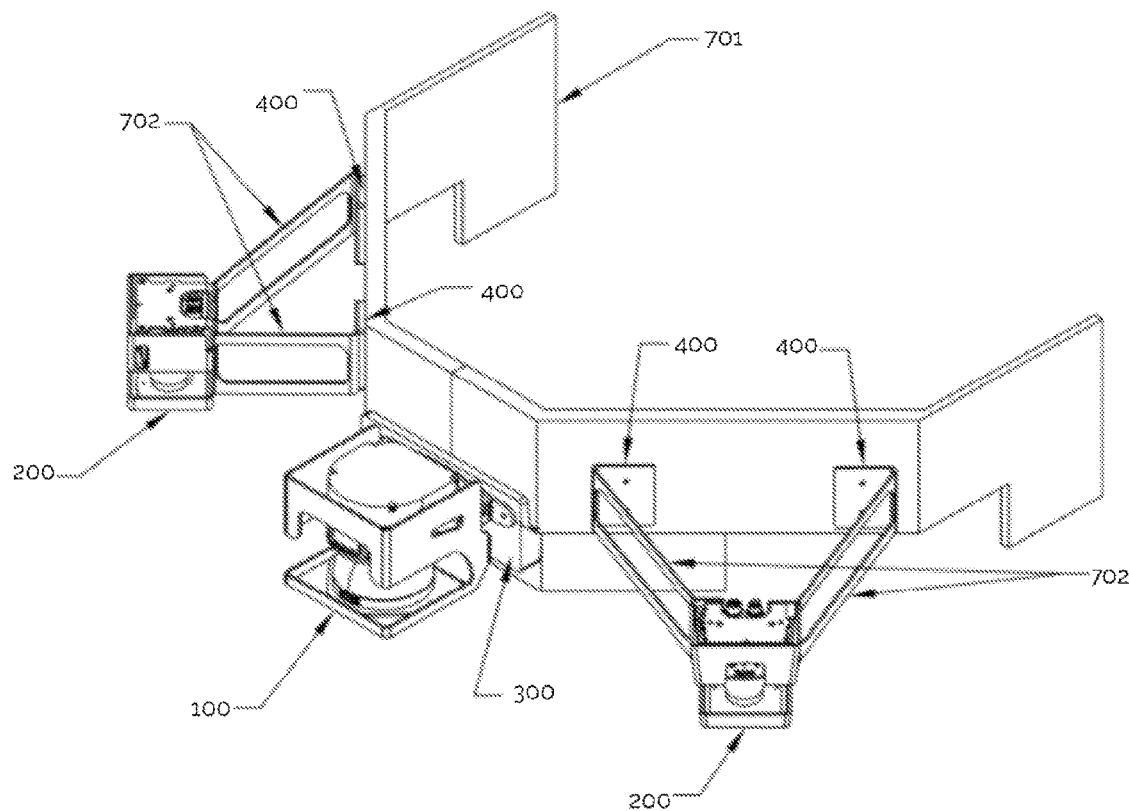
[Figure 7]

Raymond 8510
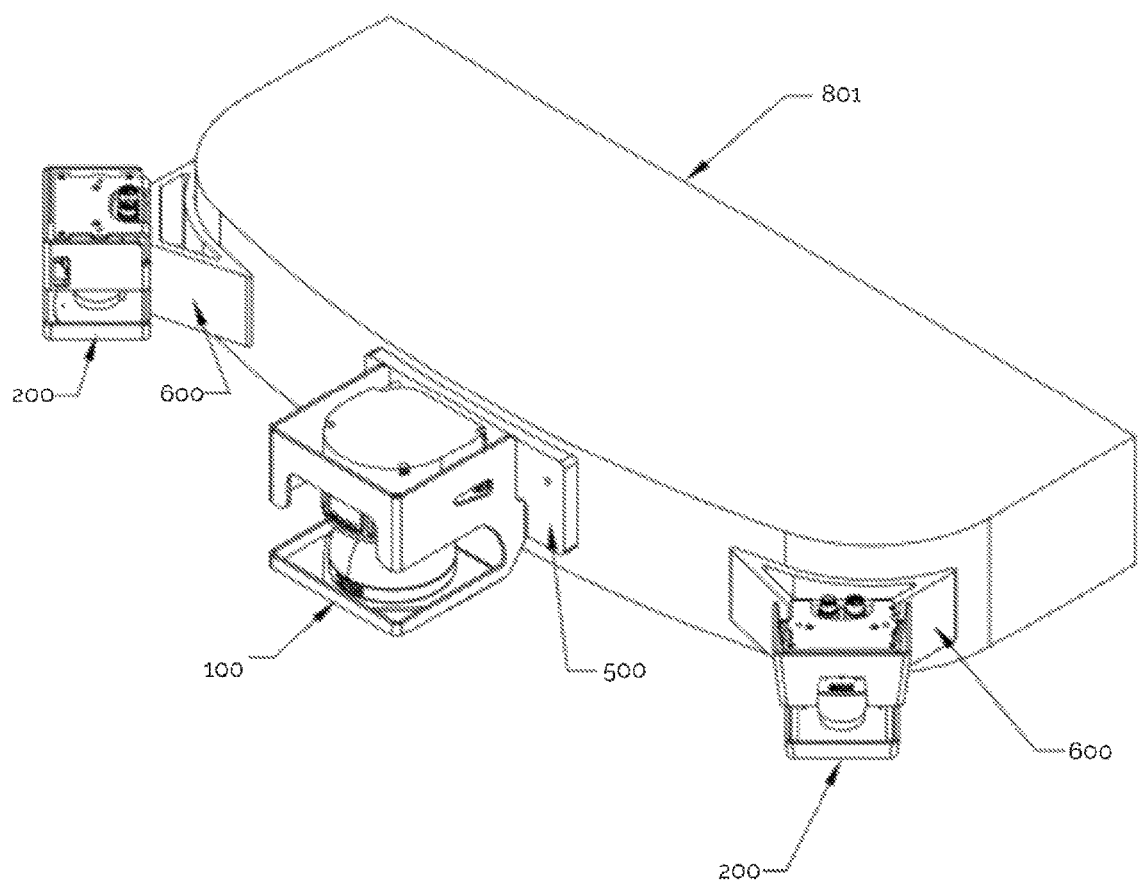
[Figure 8]

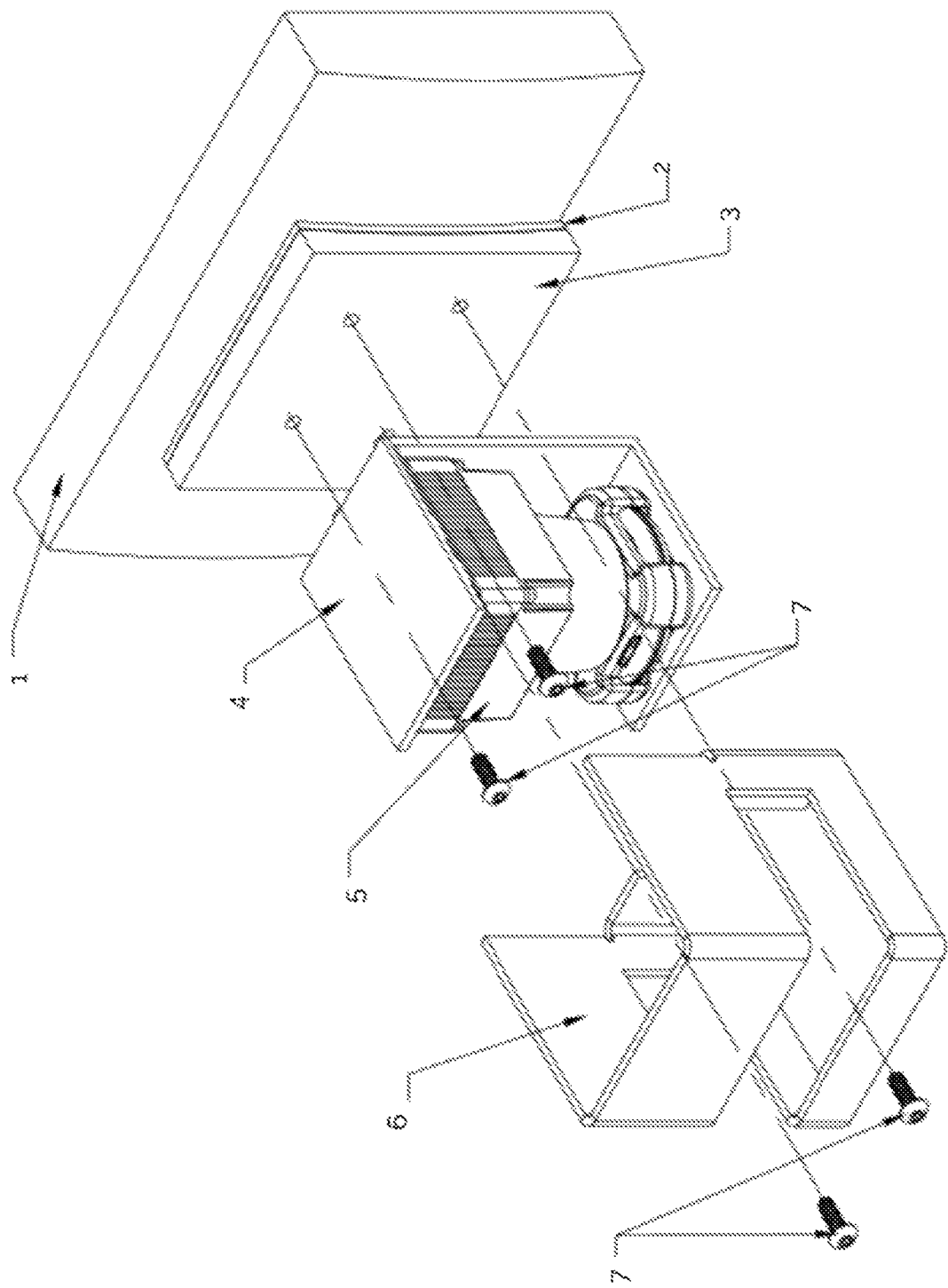
[Figure 9]

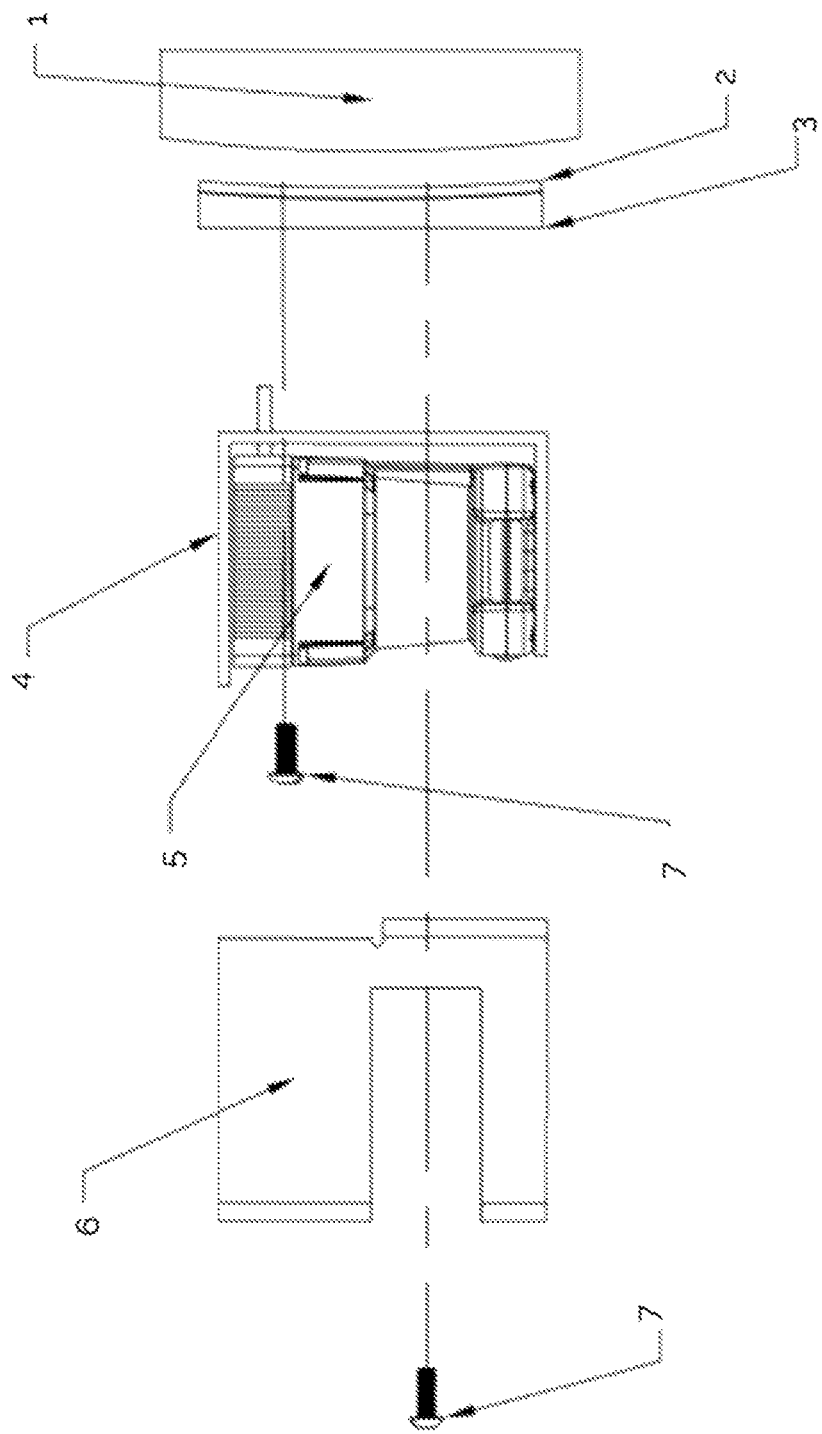
[Figure 10]

NON-DESTRUCTIVE KIT MOUNTING SYSTEM FOR DRIVERLESS INDUSTRIAL VEHICLES

RELATED APPLICATIONS

The present application claims priority to and benefit of U.S. Provisional Patent Application No. 62/743,584, filed Oct. 10, 2018, which is hereby incorporated by reference for all purposes, as if set forth herein in its entirety.

TECHNICAL FIELD

The present disclosure relates generally to vehicle control, and more specifically to non-destructive kit mounting system for driverless industrial vehicles.

BACKGROUND OF THE INVENTION

Driverless vehicles are becoming more and more common in everyday life.

SUMMARY OF THE INVENTION

A system comprising a sensor, a protective enclosure configured to enclose the sensor and a mounting pad configured to be attached to a predetermined surface of a predetermined vehicle is disclosed. The mounting pad has a predetermined contact area as a function of a weight of the sensor and the protective enclosure. The sensor and the protective enclosure are attached to the mounting pad, and the mounting pad is attached to the predetermined surface of the vehicle using an adhesive layer that extends over the predetermined contact area that is selected to provide a maximum weight support that is correlated to a weight of the sensor and the protective enclosure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

All sensors and vehicles mentioned and shown in the following paragraphs and diagrams are specific examples shown to explain concept and design. The idea and design of the following enclosures, pads, and mounts are able to span across all sensors and industrial vehicles, not just specifically the ones mentioned.

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of an isometric view of the universal front sensor enclosure, in accordance with an example embodiment of the present disclosure;

FIG. 2 is a diagram of an isometric view of the universal side sensor enclosure, in accordance with an example embodiment of the present disclosure;

FIG. 3 is a diagram of an isometric view of the front mounting pad, in accordance with an example embodiment of the present disclosure;

FIG. 4 is a diagram of an isometric view of the side mounting pad, in accordance with an example embodiment of the present disclosure;

FIG. 5 is a diagram of an isometric view of the front mounting pad, in accordance with an example embodiment of the present disclosure;

FIG. 6 is a diagram of an isometric view of the side mounting pad, in accordance with an example embodiment of the present disclosure;

FIG. 7 is a diagram of an isometric view of the Crown PC4500 bumper assembly with all sensors mounted using their corresponding enclosures and mounting pads, in accordance with an example embodiment of the present disclosure;

FIG. 8 is a diagram of an isometric view of the Raymond 8510 bumper assembly with all sensors mounted using their corresponding enclosures and mounting pads, in accordance with an example embodiment of the present disclosure;

FIG. 9 is a diagram of an isometric view of a simple universal adhesive mounting system assembly, in accordance with an example embodiment of the present disclosure; and FIG. 10 is a diagram of a side view of a side view of a simple universal adhesive mounting system assembly, in accordance with an example embodiment of the present disclosure.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

There has been a push for autonomous vehicles in the industrial setting to reduce human error and to increase productivity. These vehicles can range from pallet trucks, forklifts and tuggers to industrial cleaners and more. In order for these autonomous vehicles to navigate their surroundings they must be equipped with various pieces of equipment, from sensors to computer hardware. This equipment should be mounted securely to and accurately located on the vehicle they are serving. The mounting process can be destructive to the vehicle when classic forms of fasteners are used, such as nuts and bolts, and it can be difficult to scale the mounting method across a large variety of vehicles with different body styles and sizes.

When using such traditional forms of fasteners, the mounting hardware typically needs to be custom made for the particular vehicle it is on. Customization increases the time and money required to design and manufacture the vehicles. These traditional fasteners can also require large holes to be drilled into the body of the vehicle. In addition to the time and energy it takes to drill these holes, doing so can be risky. For example, if a hole is not drilled correctly the first time, the vehicle can be rendered useless until the hole is repaired or the damaged part is replaced.

Old forms of fasteners can also make a retrofitting process complicated and time consuming, if an existing vehicle is retrofitted to install automation controls. When retrofitting a vehicles with such equipment, it is desirable for the hardware to be mounted quickly, accurately and with ease. The present disclosure provides a quick, easy and accurate way to mount hardware to a wide variety of vehicles without causing damage to those vehicles.

A universal non-destructive adhesive based mounting system is disclosed for the purpose of retrofitting existing industrial vehicles with driverless technology. By using a strong industrial adhesive tape and a universalized mounting system, the autonomous kit can be mounted to any suitable industrial vehicle with ease, accuracy, and without damaging the vehicle, unlike traditional methods. In one example embodiment, the mounting system can include a mounting pad, a protective enclosure and industrial adhesive tape, and can utilize off the shelf sensors, autonomous driving equipment (such as sensors, computers and so forth) and their accompanying mounting hardware. The disclosed mounting process can be installed in the field or in a shop setting or in other suitable manners.

FIG. 1 is a diagram of an isometric view of universal front sensor enclosure 100, in accordance with an example embodiment of the present disclosure. Enclosure 100 includes mounting tabs 101, access holes 102 and viewing window 103, and can be used to house a safety laser sensor, such as a SICK Microscan 3 Sensor, available from SICK, Inc. of Houston Tex., or other suitable sensors.

Enclosure 100 can be configured to allow the corresponding sensor to be mounted to a suitable industrial vehicle when paired with a mounting pad, such as mounting 300 or mounting pad 500 shown herein below. Enclosure 100 can be made from a suitable type of sheet metal, such as aluminum or steel, or other suitable materials. The sheet metal can be easily cut and bent into shape using various manufacturing methods. Enclosure 100 can fit around the sensor and protect it on three sides, front, left, and right. Enclosure 100 can be mounted to a front mounting pad, in the two cases given: mounting pad 300 and mounting pad 500. Enclosure 100 can be mounted to the mounting pad using the mounting tabs 101. Tabs 101 can align with threaded holes located on the front mounting pad 300 or 500. Screws can be used to attach the enclosure 100 to the mounting pad 300 or 500. The sensor sits inside the front enclosure 100 and is then mounted to the front mounting pad using the manufacturer's mounting brackets. These mounting brackets can be adjusted using screws to manipulate the tilt of the sensor. In order to access these adjustment screws, access holes 102 can be provided to the front enclosure 100 to allow the necessary tools to reach the adjustment screws. In order for a user to have a clear view of the sensor, a viewing window 103 can be added to the front enclosure 100. This viewing window 103 is slightly larger than the vision window of the sensor to allow sufficient clearance of the laser.

FIG. 2 is a diagram of an isometric view of the universal side sensor enclosure 200, in accordance with an example embodiment of the present disclosure. Enclosure 200 can be configured to house a laser sensor, such as a SICK TIM Sensor or other suitable sensors, when paired with a mounting pad, such as 400 or 600. Enclosure 200 can be made from a suitable type of sheet metal, such as aluminum or steel, or other suitable materials. The sheet metal can be easily cut and bent into shape using various manufacturing methods. Enclosure 200 can fit around the sensor and protects it on three sides, front, left, and right. Enclosure 200 can be mounted to the side mounting pad, in the two cases given: pads 400 and 600. Enclosure 200 can be mounted to the mounting pad using the mounting tabs 201 or in other suitable manners. Tabs 201 can align with threaded holes located on the side mounting pad 400 or 600. Screws can then be used to attach the enclosure 200 to the mounting pad 400 or 600. The sensor can sit inside the side enclosure 200 and can then mounted to the side mounting pad using the manufacturer's mounting brackets. These mounting brackets can be adjusted using screws to manipulate the tilt of the sensor. In order to access these adjustment screws, access holes 202 can be added to the side enclosure 200 to allow the necessary tools to reach the adjustment screws. In order to provide a clear view of the sensor, a viewing window 203 can be added to the side enclosure 200. This viewing window 203 can be slightly larger than the vision window of the sensor to allow sufficient clearance of the laser.

FIG. 3 is a diagram of an isometric view of the front mounting pad 300, in accordance with an example embodiment of the present disclosure. Mounting pad 300 can be configured to mount the front sensor enclosure 100 and corresponding sensor to the front of a suitable industrial vehicle, such as a Crown PC4500 pallet truck or other suitable vehicles.

Mounting pad 300 can be used as an adapter to mount the front sensor, such as a SICK Microscan 3, to the front bumper 701 of the lift truck. This mounting pad can be machined from a suitable material, such as plastics or metals, depending on the sensor and application it is configured for. The curved side 301 of the mounting pad 300 can be configured for the shape of the front bumper 701 of the Crown PC4500 lift truck or in other suitable manners. In this example embodiment, the contour can fit snuggly against the bumper with the adhesive tape between the two surfaces. In order to fit the contour of mounting pad 300 to front bumper 701, measurements of the specific point on the bumper where mounting pad 300 will be installed can be taken with a 3D scanner accompanied with a contour gauge, such as a General Tools 833 Plastic Contour Gauge available from General Tools & Instruments, 75 Seaview Drive, Secaucus, N.J. 07094. From these measurements, a 3D CAD model can be made to reflect the measured contour, or other suitable processes can also or alternatively be used. A prototype can then be created and modified, if needed. Once the proper contour is found, a 3D CAD model of the mounting pad can be generated and the curved surface of the final mounting pad can be manufactured created using computer numerical control machining or other suitable processes.

The threaded mounting holes 302 can be used to attach the protective sensor enclosure 100 and the sensor mounting brackets to the mounting pad using screws. The thickness of the mounting pad can be configured so that the screws being used have a proper thread depth for strength. Other suitable embodiments can also or alternatively be used. Mounting pad 300 can include a planar outer surface having the plurality of threaded mounting holes 302 and a curved inner surface having the curved side, so as to allow the sensor and sensor housing to be attached to a planar surface while allowing the mounting pad 300 to be attached to a non-planar surface.

In one example, mounting pad 300 can be configured to have a contact surface area that corresponds to a weight of a sensor and housing that will be attached to mounting pad 300. In this example embodiment, the weight of the sensor and housing can be used to determine the contact area as a function of the properties of the adhesive material that is used to secure mounting pad 300 to the surface of the vehicle. In this example, mounting pad 300 can have an associated weight rating, where the sensor and housing that are to be used with mounting pad 300 can be matched, to allow the sensor and housing to be secured to mounting pad 300 without damaging the surface of the vehicle while avoiding an excessive loading on mounting pad 300 that could cause the adhesive to fail.

FIG. 4 is a diagram of an isometric view of the side mounting pad 400, in accordance with an example embodiment of the present disclosure. Side mounting pad 400 can be configured to mount the side sensor enclosure 200 and corresponding sensor to the front of a suitable industrial vehicle, such as a Crown PC4500 pallet truck or other suitable vehicles.

Side mounting pad 400 can be used to mount the side sensor, such as a SICK TIM series sensor, to a front bumper 701 of the lift truck or to other suitable vehicle parts or other suitable vehicles. Side mounting pad 400 can be machined from a suitable material, such as plastics and metals, depending on the sensor and application it is configured for. The curved side 401 of the mounting pad 400 can be configured specifically for the shape of the side of the front bumper 701 of the Crown PC4500 lift truck. The contour can be adapted so that it fits against the bumper with the adhesive tape between the two surfaces. The threaded mounting holes 402 can be used to attach the protective sensor enclosure 200, the mounting arms 702, and the sensor mounting brackets to the mounting pad using screws. The thickness of the mounting pad can be configured so that the screws being used have a proper thread depth for strength. Mounting pad 400 can include a planar outer surface having the plurality of threaded mounting holes 402 and a curved inner surface having the curved side, so as to allow the sensor and sensor housing to be attached to a planar surface while allowing the mounting pad 400 to be attached to a non-planar surface.

In one example, mounting pad 400 can be configured to have a contact surface area that corresponds to a weight of a sensor and housing that will be attached to mounting pad 400. In this example embodiment, the weight of the sensor and housing can be used to determine the contact area as a function of the properties of the adhesive material that is used to secure mounting pad 400 to the surface of the vehicle. In this example, mounting pad 400 can have an associated weight rating, where the sensor and housing that are to be used with mounting pad 400 can be matched, to allow the sensor and housing to be secured to mounting pad 400 without damaging the surface of the vehicle while avoiding an excessive loading on mounting pad 400 that could cause the adhesive to fail.

FIG. 5 is a diagram of an isometric view of the front mounting pad 500, in accordance with an example embodiment of the present disclosure. Front mounting pad 500 can be configured to mount the front sensor enclosure 100 and corresponding sensor to the front of a suitable industrial vehicle, such as a Raymond 8510 pallet truck.

The front mounting pad 500 can be used to be the adapter to mount the front sensor, in this case a SICK Microscan 3, to the front bumper 801 of the lift truck. The mounting pad can be machined from a suitable material, including plastics or metals, depending on the sensor and application it is configured for. The curved side 501 of the mounting pad 500 can be configured specifically for the shape of the front bumper 801 of the Raymond 8510 lift truck or other suitable vehicles or components. The contour can fit against the bumper with the adhesive tape between the two surfaces. The threaded mounting holes 502 can be used to attach the protective sensor enclosure 100 and the sensor mounting brackets to the mounting pad using screws. The thickness of the mounting pad can be configured so that the screws being used have a proper thread depth for strength, and can be associated with different sensor and sensor housings that have an acceptable weight. Mounting pad 500 can include a planar outer surface having the plurality of threaded mounting holes 502 and a curved inner surface having the curved side, so as to allow the sensor and sensor housing to be attached to a planar surface while allowing the mounting pad 500 to be attached to a non-planar surface.

In one example, mounting pad 500 can be configured to have a contact surface area that corresponds to a weight of a sensor and housing that will be attached to mounting pad 500. In this example embodiment, the weight of the sensor and housing can be used to determine the contact area as a function of the properties of the adhesive material that is used to secure mounting pad 500 to the surface of the vehicle. In this example, mounting pad 500 can have an associated weight rating, where the sensor and housing that are to be used with mounting pad 500 can be matched, to allow the sensor and housing to be secured to mounting pad 500 without damaging the surface of the vehicle while avoiding an excessive loading on mounting pad 500 that could cause the adhesive to fail.

FIG. 6 is a diagram of an isometric view of the side mounting pad 600, in accordance with an example embodiment of the present disclosure. Side mounting pad 600 can be configured to mount the side sensor enclosure 200 and corresponding sensor to the front of a suitable industrial vehicle, such as a Raymond 8510 pallet truck.

Side mounting pad 600 can be used as an adapter to mount the side sensor, such as a SICK TIM 5XX series or other suitable sensors, to the side of the front bumper 801 of the lift truck. Side mounting pad 600 can be machined from a suitable material, such as plastics or metals, depending on the sensor and application it is configured for. The curved side 601 of the mounting pad 600 can be configured for the shape of the side of the front bumper 801 of the Raymond 8510 lift truck or other suitable vehicles or structures. The contour can fit against the bumper with the adhesive tape between the two surfaces, or other suitable surfaces. The threaded mounting holes 602 can be used to attach the protective sensor enclosure 200, and the sensor mounting brackets to the mounting pad using screws. The thickness of the mounting pad can be configured so that the screws being used have a proper thread depth for strength or in other suitable manners. Side mounting pad 600 can include a planar outer surface having the plurality of threaded mounting holes 602 and a curved inner surface having the curved side, with a space between the outer surface and the inner surface defined by two side supports that are disposed at an angle to the planar outer surface and the curved inner surface, such as to allow the planar outer surface to be large enough to support a sensor and sensor housing, and to allow the curved inner surface to be large enough to provide sufficient contact area in conjunction with an adhesive to prevent the assembly from becoming detached.

In one example, mounting pad 600 can be configured to have a contact surface area that corresponds to a weight of a sensor and housing that will be attached to mounting pad 600. In this example embodiment, the weight of the sensor and housing can be used to determine the contact area as a function of the properties of the adhesive material that is used to secure mounting pad 600 to the surface of the vehicle. In this example, mounting pad 600 can have an associated weight rating, where the sensor and housing that are to be used with mounting pad 600 can be matched, to allow the sensor and housing to be secured to mounting pad 600 without damaging the surface of the vehicle while avoiding an excessive loading on mounting pad 600 that could cause the adhesive to fail.

FIG. 7 is a diagram of an isometric view of the Crown PC4500 bumper assembly with all sensors mounted using their corresponding enclosures and mounting pads, in accordance with an example embodiment of the present disclosure. The assembly of the Crown PC4500 lift truck includes sensors, mounting pads and enclosures that are mounted to the front bumper 701. The side sensors can be mounted to the side of the bumper using two side mounting pads 400 on each side. These mounting pads 400 can be adhered to the bumper using industrial adhesive tape. In order to attach the sensor and sensor enclosure 200 to the mounting pads 400, two mounting arms 702 can be used. These mounting arms 702 add clearance for the sensor vision around the bumper.

The side sensor enclosure 200 can be mounted to the mounting arms. The sensor and manufactures hardware can be mounted inside the enclosure 200. The front of the vehicle can be equipped with another sensor, in this case a SICK Microscan 3. Side sensor enclosure 200 can be mounted using the front mounting pad 300 which is adhered to the bumper using industrial adhesive tape or in other suitable manners. The sensor mounting brackets and sensor enclosure 100 can be mounted to the mounting pad 300 using screws and threaded holes or in other suitable manners.

FIG. 8 is a diagram of an isometric view of the Raymond 8510 bumper assembly with all sensors mounted using their corresponding enclosures and mounting pads, in accordance with an example embodiment of the present disclosure. The assembly of the Raymond 8510 lift truck after all sensors, mounting pads and enclosures are mounted to the front bumper 801 is shown. The side sensors can be mounted to the side of the bumper using a mounting pad 600 on each side or in other suitable manners, such as by adhering mounting pads 600 to the bumper using industrial adhesive tape. The side sensor enclosure 200 can then be mounted to the mounting pads 600. The sensor and manufactures hardware can be mounted inside the enclosure 200, and the front of the vehicle can be equipped with another sensor, such as a SICK Microscan 3 or other suitable sensors. The sensor can be mounted using the front mounting pad 500, adhered to the bumper using industrial adhesive tape or in other suitable manners. The sensor mounting brackets and sensor enclosure 100 can be mounted to the mounting pad 500 using screws and threaded holes.

FIG. 9 is diagram of an isometric view of a simple universal adhesive mounting system assembly, in accordance with an example embodiment of the present disclosure. FIG. A includes vehicle bumper or body 1, industrial adhesive tape 2, mounting pad 3, manufacturer mounting bracket(s) 4, sensor 5, protective enclosure 6 and screws 7.

FIG. 10 is a diagram of a side view of a simple universal adhesive mounting system assembly, in accordance with an example embodiment of the present disclosure. The parts shown in FIG. B are not configured for any specific vehicle or sensor, rather they are simplified versions to illustrate more clearly the assembly and how parts relate to each other.

The vehicle bumper or body 1 can be a rigid and sturdy part of the vehicle. This area can be located where the mounting pad 3 will be adhered using a thin layer of industrial adhesive tape 2. Th mounting surface of the mounting pad 3 can be configured to match the contour of the vehicle area it is adhered to, to ensure a better fit and therefore a stronger bond to the vehicle. The back of the mounting pad 3 can be curved concave to fit flush against the convex curve of the vehicle bumper 1. The mounting pad 3 can be modified to ensure proper fit, while all other parts can stay the same. The sensor 5 can be mounted to the mounting pad 3 via its manufacturers mounting bracket(s) 4. The manufactures mounting bracket 4 can then be mounted to the mounting pad 3 using screws 7 fastened into threaded holes in the mounting pad 3. The manufacturer's mounting bracket 4 can be used for simplicity and to lower manufacturing costs, and can also offer sensor adjustment settings that can be useful for accurate calibration. The protective enclosure 6 can fit around the sensor assembly, to protect it from debris and mild impact. The protective enclosure 6 can mount directly to the mounting pad 3 via screws 7 fastened into threaded holes on the mounting pad. The entire assembly can be used to provide a secure non-destructive sensor mount on the surface of a suitable vehicle bumper or body 1.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system comprising:
   a sensor;
   a protective enclosure configured to enclose the sensor;
   a mounting pad configured to be attached to a predetermined surface of a predetermined vehicle, the mounting pad having a predetermined contact area as a function of a weight of the sensor and the protective enclosure, wherein the mounting pad comprises a planar outer surface and a curved inner surface; and
   wherein the sensor and the protective enclosure are attached to the mounting pad, and the mounting pad is attached to the predetermined surface of the vehicle using an adhesive layer that extends over the predetermined contact area that is selected to provide a maximum weight support that is correlated to a weight of the sensor and the protective enclosure.

2. The system of claim 1 wherein the sensor comprises a laser sensor emitting a laser signal and the protective enclosure comprises a window configured to allow the laser signal to be emitted.

3. The system of claim 1 wherein the sensor comprises a laser sensor emitting a laser signal and the protective enclosure comprises a window configured to allow the laser sensor to be adjusted.

4. The system of claim 1 wherein the mounting pad comprises a plurality of screw threads configured to accept the sensor and the protective enclosure if they have a weight that is less than a maximum acceptable weight for the mounting pad.

5. The system of claim 1 wherein the planar outer surface forms an internal cavity with the curved inner surface and two side walls.

6. The system of claim 1 wherein the two side walls are disposed at an angle of greater than 90 degrees from the planar outer surface and less than 90 degree from the curved inner surface to allow the curved inner surface to be larger than the planar outer surface.

7. The system of claim 1 wherein the sensor comprises a laser sensor emitting a laser signal and the protective enclosure comprises a window configured to allow the laser signal to be emitted and the laser sensor to be adjusted.

8. The system of claim 1 wherein the sensor comprises a laser sensor emitting a laser signal and the protective enclosure comprises a window configured to allow the laser signal to be emitted and wherein the mounting pad comprises a plurality of screw threads configured to accept the sensor and the protective enclosure if they have a weight that is less than a maximum acceptable weight for the mounting pad.

9. The system of claim 1 wherein the sensor comprises a laser sensor emitting a laser signal and the protective enclosure comprises a window configured to allow the laser signal to be emitted and wherein the planar outer surface forms an internal cavity with the curved inner surface and two side walls.

10. A method for retrofitting a vehicle comprising:
    selecting a mounting pad as a function of a vehicle design and a weight limit;
    securing the mounting pad to the vehicle with an adhesive;
    selecting a sensor and sensor housing as a function of the selected mounting pad; and
    securing the sensor and the sensor housing to the mounting pad using a plurality of threaded connectors, wherein selecting the mounting pad as a function of the vehicle design further comprises scanning a mounting surface contour with a three dimensional scanner to generate a contour data file.

11. The method of claim 10 wherein selecting the mounting pad as a function of the vehicle design further comprises selecting the mounting pad as a function of the sensor and the sensor housing.

12. The method of claim 7, wherein selecting the mounting pad as a function of the vehicle design further comprises using a computer numerical control machining process to fabricate the mounting pad contour using the contour data file.

13. A system comprising:
    a sensor;
    a protective enclosure configured to enclose the sensor;
    a mounting pad configured to be attached to a predetermined surface of a predetermined vehicle, the mounting pad having a predetermined contact area as a function of a weight of the sensor and the protective enclosure; and wherein the sensor and the protective enclosure are attached to the mounting pad, and the mounting pad is attached to the predetermined surface of the vehicle using an adhesive layer that extends over the predetermined contact area that is selected to provide a maximum weight support that is correlated to a weight of the sensor and the protective enclosure, wherein the sensor comprises a laser sensor emitting a laser signal and the protective enclosure comprises a window configured to allow the laser signal to be emitted.

14. The system of claim 13 wherein the protective enclosure comprises a window configured to allow the laser sensor to be adjusted.

15. The system of claim 13 wherein the mounting pad comprises a plurality of screw threads configured to accept the sensor and the protective enclosure if they have a weight that is less than a maximum acceptable weight for the mounting pad.

16. The system of claim 13, wherein the mounting pad comprises a planar outer surface and a curved inner surface.

17. The system of claim 13 wherein the mounting pad comprises a planar outer surface and a curved inner surface, the planar outer surface forming an internal cavity with the curved inner surface and two side walls.

18. The system of claim 13 wherein the mounting pad comprises a planar outer surface and a curved inner surface, the planar outer surface forming an internal cavity with the curved inner surface and two side walls, wherein the two side walls are disposed at an angle of greater than 90 degrees from the planar outer surface and less than 90 degree from the curved inner surface to allow the curved inner surface to be larger than the planar outer surface.

19. The system of claim 13 wherein the protective enclosure comprises a window configured to allow the laser sensor to be adjusted and wherein the mounting pad comprises a plurality of screw threads configured to accept the sensor and the protective enclosure if they have a weight that is less than a maximum acceptable weight for the mounting pad.

20. The system of claim 13 wherein the protective enclosure comprises a window configured to allow the laser sensor to be adjusted and wherein the mounting pad comprises a planar outer surface and a curved inner surface.

* * * * *